United States Patent Office 3,334,126
Patented Aug. 1, 1967

3,334,126
ARYL N-METHYL SUBSTITUTED
THIONOCARBAMATES
Koshin Miyazaki, Takaoka-shi, Koichi Hashimoto, Kahoku-gun, Aritsune Kaji and Reiji Sakimoto, Takaoka-shi, Kanji Taniguchi, Fujisawa-shi, Teruhisa Noguchi, Kamakura-shi, and Yoshinobu Igarashi, Chaya-machi, Oiso-machi, Naka-gun, Japan, assignors to Nippon Soda Kabushiki Kaisha, Tokyo-to, Japan, a company of Japan
No Drawing. Filed Feb. 18, 1966, Ser. No. 528,412
Claims priority, application Japan, June 21, 1961, 36/21,360; Aug. 25, 1961, 36/30,335; Apr. 9, 1962, 37/13,560; Apr. 13, 1962, 37/14,384
13 Claims. (Cl. 260—455)

This invention relates to novel and useful aryl N-substituted thionocarbamates. This is a continuation-in-part application of the application filed on May 23, 1962, Ser. No. 196,890, now abandoned.

The novel aryl N-substituted thionocarbamates of this invention have the following general formula:

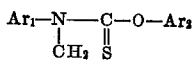

wherein $Ar_1$ is 1-naphthyl, phenyl, tolyl, halophenyl, $CF_3$ phenyl or methoxyphenyl, and $Ar_2$ is 2-naphthyl, tolyl, methoxyphenyl or halophenyl with the proviso that at least one of $Ar_1$ and $Ar_2$ is naphthyl.

The compounds of this invention are useful as fungicides for fungal infections on the human skin.

The compounds of this invention are manufactured by the processes represented by the following equations:

(1) 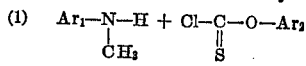

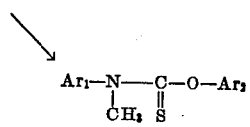

(2) 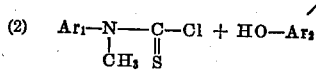

In these formulae, $Ar_1$ and $Ar_2$ have the same meaning as defined above.

These processes are explained in further detail as follows:

The reactions indicated by the Equations 1 and 2 are successfully carried out by the use of a suitable solvent, such as water, ethanol, methanol, acetone and chloroform, and by the use of a dehydrochlorination agent such as alkali metal bicarbonates, alkali metal carbonates, alkali metal hydroxides, alkali earth metal hydroxides, tertiary amines and the same amines as the ones used as reagents in the reaction.

The preferable reaction temperature is between 0° and 100° C., and the reaction time may be between 10 and 120 minutes.

When water is used as the reaction medium, the product precipitates out at the end of the reaction. When an organic solvent is used, the product is obtained as a solid residue by evaporation of the solvent after completion of the reaction.

The reaction product is washed with water and is purified by recrystallization from a suitable organic solvent, such as acetone, alcohol, benzene, or carbon tetrachloride.

Aryl chlorothionoformates, the starting material of the reaction according to Equation 1, are prepared by the reaction of thiophosgen and the compounds of the group consisting of 2-naphthol, 4-methylphenol, 4-methoxyphenol, 4-chlorophenol and 4-bromophenol, 4-fluorophenol and 4-iodophenol in the presence of a dehydrochlorination agent. N-substituted thiocarbamoyl chlorides, the starting material of the reaction according to the Equation 2 are prepared by the reaction of bis(N-substituted thiocarbamoyl) disulfide and chlorine, and of secondary amine and thiophosgen.

Aryl N-substituted thionocarbamates have been proved by extensive tests in vitro and in vivo to be useful substances which have specific therapeutic activity against micotic infections on the skin (such as trichophytia).

The invention will now be more fully described in a number of examples but it should be understood that these are given by way of illustration and not of limitation; many modifications can be made in the details without departing from the spirit of the invention.

Example 1

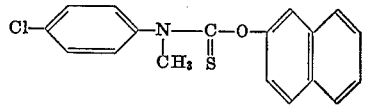

A mixture of 14.2 g. of N-methyl-4-chloroaniline and 8.4 g. of sodium hydrogencarbonate in 100 cc. of water was stirred at 0° to 10° C., and 22.3 g. of finely powdered 2-naphthyl chlorothionoformate was added in small portions thereto. The mixture was stirred at 10–15° C. for 1 hour after completion of the addition, the precipitated crystals were collected by filtration, washed with water and dried. Obtained were 31.0 g. (95% yield) of 2-naphthyl-N-methyl-N-(4-chlorophenyl)thionocarbamate. Recrystallization from ethanol gave colorless needle crystals of M.P. 127–128° C.

Analysis.—Calcd. for $C_{18}H_{14}ClNOS$: N=4.28%. Found: N=4.49%.

Example 2

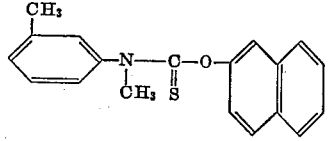

A mixture of 4.0 g. of N-methyl-3-toluidine and 2.8 g. of sodium hydrogencarbonate in 50 cc. of acetone was stirred at 0° to 10° C., and 7.4 g. of 2-naphthyl chlorothionoformate was added in small portions thereto and the mixture was heated under reflux for 30 minutes. The cooled mixture was poured into ca. 150 cc. of cold water and 2-naphthyl-N-methyl-N-(3-tolyl)thionocarbamate was obtained as white crystals. Yield, 9.1 g. (90%). Recrystallization from alcohol gave colorless needle crystals, M.P. 110.5–111.5° C.

Analysis.—Calcd. for $C_{19}H_{17}NOS$: N=4.56%. Found: N=4.10%.

Example 3

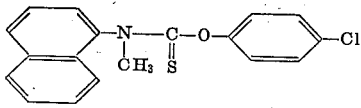

A mixture of 15.7 g. of N-methyl-1-naphthylamine and 8.4 g. of sodium hydrogen carbonate in 100 cc. of ethanol was stirred at 0° to 10° C., and 20.7 g. of 4-chlorophenyl chlorothionoformate was added dropwise thereinto. After completion of the addition, the reaction mixture was stirred at 45–50° C. for 30 minutes, cooled, and poured into ca. 200 cc. of cold water; thus 29.5 g. of 4-chlorophenyl N-methyl-N-(1-naphthyl)thionocarbamate was obtained as white crystals. Recrystallization from ethanol gave colorless needle crystals, M.P. 115.5–116° C.

*Analysis.*—Calcd. for C₁₈H₁₄ClNOS: N=4.28%. Found: N=4.21%.

*Example 4*

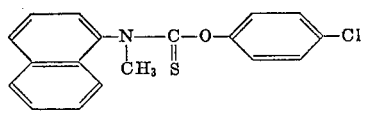

A mixture of 12.8 g. of 4-chlorophenol, 23.5 g. of N-methyl-N-(1-naphthyl)thiocarbamoyl chloride, and 5.3 g. of powdered sodium carbonate in 150 cc. of methyl ethyl ketone was heated under reflux for 2 hours. After the reaction was complete, the mixture was distilled to remove the solvent, and to the residue ca. 200 cc. of cold water was added. 28.0 g. of white crystals was obtained. Recrystallization from ethanol gave colorless needle crystals, M.P. 115–116° C., which was undepressed on admixture with the product in Example 3.

*Example 5*

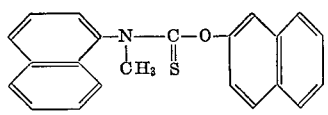

A mixture of 15.7 g. of N-methyl-1-naphthylamine and 5.3 g. of sodium carbonate in 100 cc. of acetone was cooled to 0° to 10° and 22.3 g. of 2-naphthyl chlorothionoformate was added in small portions thereinto. The mixture was heated under reflux for 30 minutes, cooled and poured into ca. 200 cc. of cold water; obtained were 30.5 g. of 2-naphthyl N-methyl-N-(1-naphthyl)thionocarbamate as white crystals. Recrystallization from a mixture of alcohol and acetone gave colorless needle crystals of M.P. 147° C.

*Analysis.*—Calcd. for C₂₂H₁₇NOS: N=4.09%. Found: N=3.80%.

*Example 6*

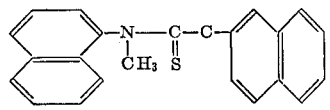

A mixture of 14.4 g. of 2-naphthol, 23.5 g. of N-methyl-N-(1-naphthyl)thiocarbamoyl chloride, 8.4 g. of sodium hydrogencarbonate, and 150 cc. of methyl ethyl ketone was treated according to the procedure of Example 4, then 27.5 g. of 2-naphthyl N-methyl-N-(1-naphthyl)thionocarbamate was obtained. Recrystallization from methyl ethyl ketone gave colorless needle crystals of M.P. 147° C., which was undepressed on admixture with the product in Example 5.

*Example 7*

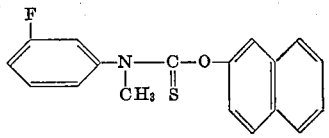

A mixture of 4.8 g. of N-methyl-3-fluoroaniline and 3.4 g. of sodium hydrogen carbonate in 50 cc. of acetone was stirred. To the mixture, 8.6 g. of finely powdered 2-naphthyl chlorothionoformate was added portion-wise so as to maintain the reaction temperature at 10° to 20° C. After completion of the addition, the mixture was further stirred at 50–55° C. for 15 min., then cooled to room temperature. The cooled mixture was poured into 150 cc. of ice water, the precipitated crystalline material was collected by filtration, washed with water, and dried; obtained were 8.8 g. of 2-naphthyl N-methyl-N-(3-fluorophenyl)thionocarbamate. Recrystallization from ethanol gave 6.0 g. of colorless needle crystals of M.P. 99–101° C.

*Analysis.*—Calcd. for C₁₈H₁₄FNOS: N=4.50%. Found: N=4.30%.

*Example 8*

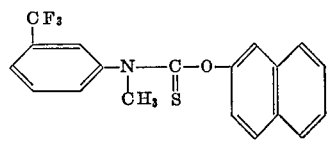

Finely crushed 2-naphthyl chlorothionoformate (19.3 g.) was added under stirring into a mixture of 15.2 g. of N-methyl-3-trifluoromethylaniline, 7.5 g. of sodium hydrogen carbonate and 50 cc. of acetone at a temperature of 10° C. to 20° C. After completion of the addition, the mixture was boiled under reflux for 15 min., then cooled to room temperature. The cooled mixture was poured into ca. 150 cc. of ice water, the precipitated material was collected by filtration, washed with water and dried. 2-naphthyl N-methyl-N-(3-trifluoromethylphenyl)thionocarbamate was obtained as brownish white granules. Recrystallization from methanol gave 7.5 g. of refined 2 - naphthyl N - methyl - N - (3 - trifluoromethyl)thionocarbamate as pale yellow needle crystals of M.P. 73–75° C.

*Analysis.*—Calcd. for C₁₉H₁₄F₃NOS: N=4.16%. Found: 3.88%.

*Example 9*

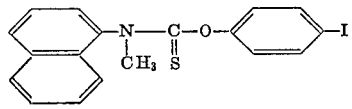

A mixture of 8.9 g. of N-methyl-1-naphthylamine, 4.2 g. of sodium hydrogen carbonate and 100 cc. of acetone was stirred at a temperature of 5 to 10° C., to which 14.9 g. of 4-iodophenyl chlorothionoformate was added during five minutes. After completion of the addition, the mixture was further stirred at a temperature of 50 to 55° C. for 15 minutes, then cooled to 10° C. The cooled mixture was poured into ca. 200 cc. of ice water, the precipitated material was collected by filtration, then crushed and washed with water and dried. 19 g. of 4-iodophenyl N-methyl-N-(1-naphthyl)thionocarbamate was obtained as brownish powder of M.P. 156–159° C. Recrystallization from a mixture of acetone and alcohol gave 14.9 g. of pure 4-iodophenyl N-methyl-N-(1-naphthyl)thionocarbamate as slightly brown needles of M.P. 161.5–162.5° C.

*Analysis.*—Calcd. for C₁₈H₁₄INOS: N=3.34%. Found: N=2.94%.

Other compounds prepared by the process similar to those described in the foregoing examples are listed in Table 1.

TABLE 1

| No. | Formula | M.P. (° C.) | Formula | Analysis N (percent) | |
|---|---|---|---|---|---|
|  |  |  |  | Calcd. | Found |
| 1 |  | 131 | C₁₈H₁₅NOS | 4.77 | 4.49 |

TABLE 1—Continued

| No. | Formula | M.P. (°C.) | Formula | Analysis N (percent) | |
|---|---|---|---|---|---|
| | | | | Calcd. | Found |
| 2 | [structure: N-methyl-N-(o-methylphenyl) thionocarbamate of 2-naphthol] | 109–110 | $C_{19}H_{17}NOS$ | 4.56 | 4.42 |
| 3 | [structure: N-methyl-N-(p-methylphenyl) thionocarbamate of 2-naphthol] | 117–118 | $C_{19}H_{17}NOS$ | 4.56 | 4.3? |
| 4 | [structure: N-methyl-N-(o-fluorophenyl) thionocarbamate of 2-naphthol] | 96–97 | $C_{18}H_{14}FNOS$ | 4.50 | 4.37 |
| 5 | [structure: N-methyl-N-(p-fluorophenyl) thionocarbamate of 2-naphthol] | 115–116 | $C_{18}H_{14}FNOS$ | 4.50 | 4.48 |
| 6 | [structure: N-methyl-N-(o-chlorophenyl) thionocarbamate of 2-naphthol] | 118–119 | $C_{18}H_{14}ClNOS$ | 4.28 | 4.10 |
| 7 | [structure: N-methyl-N-(p-methoxyphenyl) thionocarbamate of 2-naphthol] | 93–95 | $C_{19}H_{17}NO_2S$ | 4.33 | 4.46 |
| 8 | [structure: N-methyl-N-(2-naphthyl) thionocarbamate of p-cresol] | 141–142 | $C_{19}H_{17}NOS$ | 4.56 | 4.26 |
| 9 | [structure: N-methyl-N-(2-naphthyl) thionocarbamate of p-methoxyphenol] | 107–108 | $C_{19}H_{17}NO_2S$ | 4.33 | 3.93 |
| 10 | [structure: N-methyl-N-(2-naphthyl) thionocarbamate of p-fluorophenol] | 123–124 | $C_{18}H_{14}FNOS$ | 4.50 | 4.63 |
| 11 | [structure: N-methyl-N-(2-naphthyl) thionocarbamate of p-bromophenol] | 141–142 | $C_{18}H_{14}BrNOS$ | 3.76 | 3.50 |

From the literature in this field, more particularly the British Patent 880,030 and the corresponding Australian Patent 243,317, it is known to use thionocarbamates which have a bacteriostatic action, as ingredients in salves and ointments for the treatment of affected skin among other uses as disinfectants.

The thionocarbamates described in the two patents are distinguished from those of the present invention by the fact that the nitrogen carries a hydrogen atom, whereas the compounds described above have a methyl attached to the nitrogen; this difference is essential and not incidental because the British patent states it to be important that the hydrogen atom shown attached to the nitrogen atom should not be substituted by any other group, because tests have shown that substitution of hydrogen atom by alkyl, aryl or aralkyl group has the effect of reducing the bacteriostatic activity of the compounds against Gram-positive organisms several hundred-fold.

Contrary thereto extended tests carried out in the studies connected with the present invention proved that compounds which have an hydrogen atom attached to the nitrogen atom are inferior to the methyl-substituted compounds by several orders.

Another distinguishing feature of the British patent as compared to the instant invention is that the British patent shows di-chlorinated phenyl rings where applicants only use mono-chlorinated phenyl rings.

Finally, it should be noted that the British patent does not contemplate using a naphthyl group as a substituent at all.

From the tests made to establish the superiority of the compounds according to the invention, some results will be described hereinbelow. Of the tests, some of which were carried out in vitro and some in vivo, only the latter will be described since they are believed to be of greater importance.

In vivo tests:
 (a) Materials
  Test animal: Healthy male albino guinea pigs, weighing 350 to 400 g., were used in this test.
  Test fungus: *Trichophyton mentagrophytes* var. *asteroides*.
  Test chemicals:

*Group A*

NFS–1077 = 2-naphthyl N-methyl-N-(1-naphthyl)thionocarbamate
NFS–1027 = 2-naphthyl N-methyl-N-phenyl thionocarbamate
NFS–1312 = 2-naphthyl N-methyl-N-(2-tolyl)thionocarbamate
NFS–1386 = 2-naphthyl N-methyl-N-(3-tolyl)thionocarbamate
NFS–1310 = 2-naphthyl N-methyl-N-(4-tolyl)thionocarbamate
NFS–3499 = 2-naphthyl N-methyl-N-(2-fluorophenyl)thionocarbamate
NFS–5021 = 2-naphthyl N-methyl-N-(3-fluorophenyl)thionocarbamate
NFS–3481 = 2-naphthyl N-methyl-N-(4-fluorophenyl)thionocarbamate
NFS–1309 = 2-naphthyl N-methyl-N-(4-chlorophenyl)thionocarbamate
NFS–5022 = 2-naphthyl N-methyl-N-(3-trifluoromethylphenyl)thionocarbamate
NFS–3508 = 2-naphthyl N-methyl-N-(4-methoxyphenyl)thionocarbamate
NFS–1361 = 4-methoxyphenyl N-methyl-N-(1-naphthyl)thionocarbamate
NFS–1076 = 4-chlorophenyl N-methyl-N-(1-naphthyl)thionocarbamate
NFS–1380 = 4-bromophenyl N-methyl-N-(1-naphthyl)thionocarbamate
NFS–5084 = 4-iodophenyl N-methyl-N-(1-naphthyl)thionocarbamate

*Group B*

CF–41 = phenyl 3,4-dichlorophenylthionocarbamate
CF–42 = 4-ethylphenyl 3,4-dichlorophenylthionocarbamate
CF–43 = 3-nitrophenyl 3,4-dichlorophenylthionocarbamate The Group A materials are compounds according to this invention; the Group B compounds are among those described in the British and Australian patents.

Each chemical was prepared to 2% solution having the following composition.

| | Percent (w./w.) |
|---|---|
| Test chemical | 2 |
| Methyl ethyl ketone | 35 |
| PPG #2,000 | 18 |
| Ethyl alcohol | 45 |

(b) Test method

To examine the therapeutic effect on a superficial trichophytosis, the test chemicals were externally applied on the skin of guinea pigs experimentally infected with the test fungus. From the third day after inoculation, sample solution was rubbed once daily into the affected parts. On the eleventh day after inoculation, the animals were killed by chloroform anesthesia, the inoculated tissue was cut out, examined for the presence of *T. mentagrophytes* var. *asteroides*. The effective rate was calculated in the following manner:

Effective rate (Percent) =
$$\frac{\text{No. of cured sites by naked eye}}{\text{No. of sites treated}} \times 100$$

(when external appearance indicated cure) and Curative rate (percent)

$$\text{Curative rate} = \frac{\text{No. of sites negative to culture}}{\text{No. of sites treated}} \times 100$$

(when externally cured and culture negative).

(c) Results.

Tests results are summarized in the following table. As shown in the figures of that table, only the compounds of Group A are highly effective on experimentally infected dermatomycosis of guinea pigs without any side action or with slight irritation. All referenced compounds Group B have no therapeutic effect on dermatomycosis, but have severe side action to affected skin.

TABLE 2

| Code No. | Chemical Formula | Group | Curative rate (percent) | Effective rate (percent) | Skin irritation |
|---|---|---|---|---|---|
| NFS–1077 | (1-naphthyl)–N(CH₃)–C(=S)–O–(2-naphthyl) | A | 93 (14/15) | 100 (15/15) | – (0/15) |
| NFS–1027 | phenyl–N(CH₃)–C(=S)–O–(2-naphthyl) | A | 100 (12/12) | 100 (12/12) | – (0/12) |
| NFS–1312 | (2-CH₃-phenyl)–N(CH₃)–C(=S)–O–(2-naphthyl) | A | 93 (14/15) | 100 (15/15) | –± (2/15) |
| NFS–1386 | (3-CH₃-phenyl)–N(CH₃)–C(=S)–O–(2-naphthyl) | A | 100 (15/15) | 100 (15/15) | – (0/15) |
| NFS–1310 | (4-CH₃-phenyl)–N(CH₃)–C(=S)–O–(2-naphthyl) | A | 100 (15/15) | 100 (15/15) | –± (1/15) |

TABLE 2—Continued

| Code No. | Test Chemicals | | Therapeutic Effect | | Skin irritation |
| --- | --- | --- | --- | --- | --- |
| | Chemical Formula | Group | Curative rate (percent) | Effective rate (percent) | |
| NFS-3499 | (2-F-C₆H₄)-N(CH₃)-C(=S)-O-naphthyl | A | 100 (12/12) | 100 (12/12) | −(0/12) |
| NFS-5021 | (3-F-C₆H₄)-N(CH₃)-C(=S)-O-naphthyl | A | 100 (12/12) | 100 (12/12) | −(0/12) |
| NFS-3481 | (4-F-C₆H₄)-N(CH₃)-C(=S)-O-naphthyl | A | 100 (12/12) | 100 (12/12) | −(0/12) |
| NFS-1309 | (4-Cl-C₆H₄)-N(CH₃)-C(=S)-O-naphthyl | A | 93 (14/15) | 100 (15/15) | −(0/15) |
| NFS-5022 | (3-CF₃-C₆H₄)-N(CH₃)-C(=S)-O-naphthyl | A | 83 (10/12) | 100 (12/12) | −(0/12) |
| NFS-3508 | (4-CH₃O-C₆H₄)-N(CH₃)-C(=S)-O-naphthyl | A | 100 (12/12) | 100 (12/12) | −(0/12) |
| NFS-1361 | naphthyl-N(CH₃)-C(=S)-O-C₆H₄-OCH₃ | A | 80 (12/15) | 87 (13/15) | −(0/15) |
| NFS-1076 | naphthyl-N(CH₃)-C(=S)-O-C₆H₄-Cl | A | 80 (12/15) | 93 (14/15) | −~±(2/15) |
| NFS-1380 | naphthyl-N(CH₃)-C(=S)-O-C₆H₄-Br | A | 66 (12/15) | 87 (13/15) | ±~+(5/15) |
| NFS-5084 | naphthyl-N(CH₃)-C(=S)-O-C₆H₄-I | A | 100 (12/12) | 100 (12/12) | −(0/12) |
| CF-41 | (3,4-Cl₂-C₆H₃)-NH-C(=S)-O-C₆H₅ | B | 0 (0/15) | 0 (0/15) | ++−+++(15/15) |
| CF-42 | (3,4-Cl₂-C₆H₃)-NH-C(=S)-O-C₆H₄-C₂H₅ | B | 0 (0/15) | 0 (0/15) | +−++(15/15) |
| CF-43 | (3,4-Cl₂-C₆H₃)-NH-C(=S)-O-C₆H₄-NO₂ | B | 0 (0/15) | 0 (0/15) | ++−+++(15/15) |

The foregoing disclosure relates only to preferred embodiments of the invention which is intended to include all changes and modifications of the examples described within the scope of the invention as set forth in the appended claims.

What is claimed is:
1. A compound of the formula

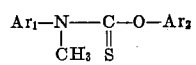

wherein Ar$_1$ is 1-naphthyl, phenyl, tolyl, halophenyl, CF$_3$-phenyl or methoxyphenyl, and Ar$_2$ is 2-naphthyl, tolyl, methoxyphenyl or halophenyl and with the proviso that at least one of Ar$_1$ and Ar$_2$ is naphthyl.

2. The compound having the formula

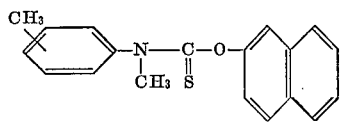

3. The compound having the formula

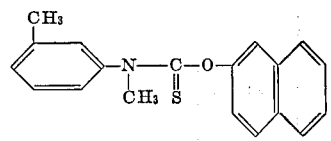

4. The compound having the formula

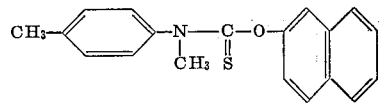

5. The compound having the formula

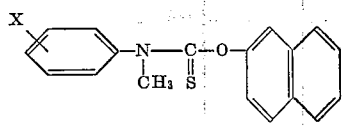

wherein X is halogen.

6. The compound having the formula

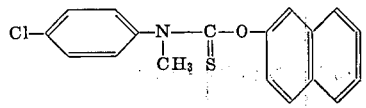

7. The compound having the formula

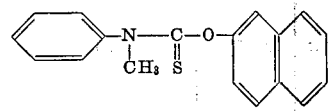

8. The compound having the formula

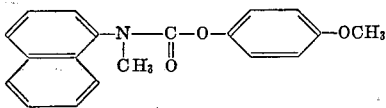

9. The compound having the formula

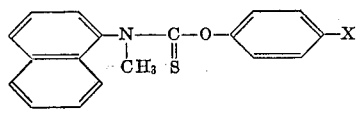

wherein X is halogen.

10. The compound having the formula

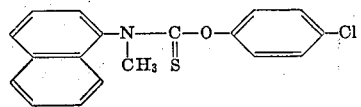

11. The compound having the formula

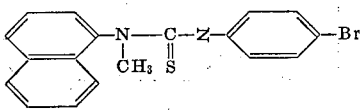

12. The compound having the formula

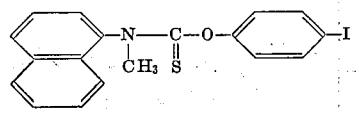

13. The compound having the formula

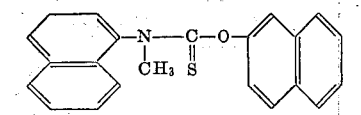

No references cited.

CHARLES B. PARKER, *Primary Examiner.*
DELBERT R. PHILLIPS, BERNARD BILLIAN,
*Assistant Examiners.*